Nov. 20, 1951     J. BERTA     2,576,063
HAND-POWER TOOL
Filed May 12, 1949
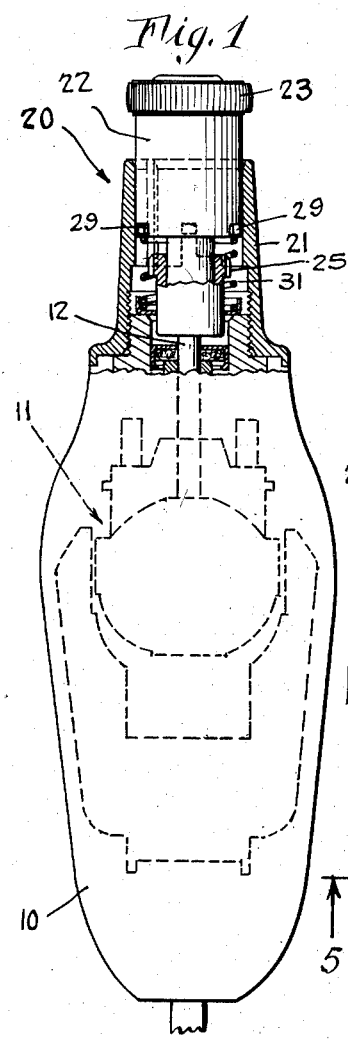
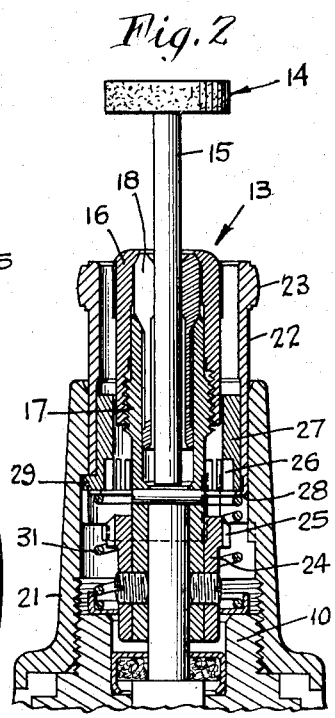
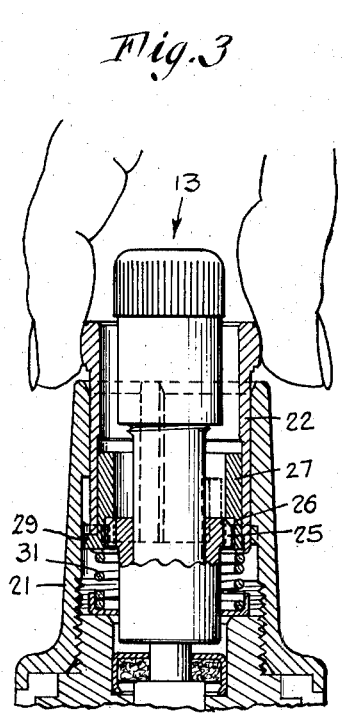
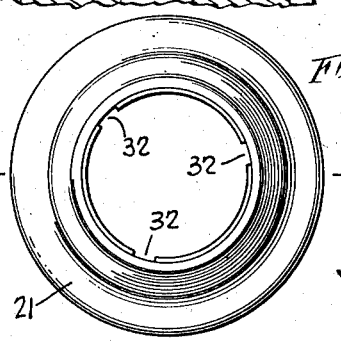
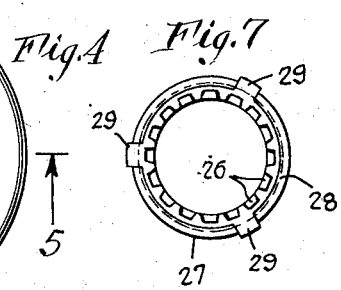
Inventor
Joseph Berta
By
Johnson and Kline
Attorneys Patented Nov. 20, 1951

2,576,063

UNITED STATES PATENT OFFICE 2,576,063

HAND POWER TOOL

Joseph Berta, Fairfield, Conn., assignor to Casco Products Corporation, Bridgeport, Conn., a corporation of Connecticut Application May 12, 1949, Serial No. 92,825

6 Claims. (Cl. 279—51)

This invention relates to small power tools of the type adapted to be held in one hand in the manner of a pencil.

The invention is concerned with improvements in the tools shown in Patents 2,341,529 and 2,436,540 issued respectively to Joseph H. Cohen on February 15, 1944, and William F. Allenby on February 24, 1948, and in the copending application of Joseph Youhouse, Serial Number 72,610 filed January 25, 1949.

The tools of the above-identified patents and application have elongate casings which carry two-part ferrules encircling the chucks; the ferrules comprise stationary outer parts or sleeves threaded to the casings, and inner telescoping parts or sleeves which are held captive in the outer sleeves and are axially movable from retracted positions wherein they expose the chucks of the tools, to extended positions wherein they encircle the chucks. In each of the tools mentioned, when the inner sleeve is retracted, it locks one of the chuck parts against turning to enable the chuck to be easily operated, and when extended, the chuck is released for turning.

The inner ferrule sleeve is assembled to and retained in the outer by its being made of two tubular members which are brought together through opposite ends of the outer ferrule sleeve and are press-fitted to each other to rigidly join them, the members having lugs or other lateral projections at their remote ends which prevent separation of the sleeves. Normally the inner sleeve is held in extended positon by a spring, this position being determined by the said lugs, which extend into recesses in the outer sleeve.

In the application of Joseph Youhouse identified above, the inner sleeve automatically snaps out to extended position under the action of the spring when the motor is energized, thereby releasing the chuck for turning. The resultant forces on the inner sleeve members produced by such action have a tendency to cause said members to work loose from each other. In overcoming this, the inner sleeve members were joined together by laying over or crimping portions of one member on the other. While this resulted in a satisfactory and secure junction, the laying-over operation was found to be difficult to perform because the outer sleeve, which was required to be in position surrounding the members of the inner sleeve, interfered with the crimping tool.

By the present invention this difficulty of assembly of the ferrule sleeves is overcome, and one object of the invention is to provide an improved chuck-locking and ferrule sleeve structure for a hand power tool, which may be very easily and quickly assembled and which at the same time successfully resists failure by breakage or separation of the parts or sub-assemblies.

A further object of the invention is to provide an improved ferrule construction as set forth above, which has few and simple, economically- fabricated parts, and which may be economically assembled.

In accomplishing the above objects, I provide in the outer ferrule sleeve longitudinally-extended, lug-clearance grooves which extend from the front of the sleeve rearward past the lug-receiving recesses thereof and then connect with lateral passages so as to communicate with the said recesses. The lug-carrying member of the inner sleeve, which has lugs at its inner or rearmost end, heretofore could not be inserted with lugs foremost through the front of the outer sleeve. However, by the provision of the said clearance grooves, the lug-carrying member may now be so inserted, and therefore this member may be first assembled to the other member of the inner sleeve by the aforesaid satisfactory and reliable crimping operation, without requiring that the outer sleeve surround the members where it would interfere with the crimping tool.

Other features and advantages will hereinafter appear.

In the accompanying drawings:

Figure 1 is a view, partly in axial section and partly in side elevation, of a hand power tool embodying the invention.

Fig. 2 is an enlarged fragmentary axial sectional view of the chuck and spindle parts of the tool, in operating position.

Fig. 3 is a view like Fig. 2 but with the chuck shown in elevation and the inner locking ferrule part held in retracted position.

Fig. 4 is a front end elevational view of the outer ferrule sleeve of the hand tool.

Fig. 5 is a section taken on line 5—5 of Fig. 4.

Fig. 6 is an inside end elevational view of the outer ferrule sleeve, and

Fig. 7 is an inside end elevational view of the locking member of the inner ferrule sleeve.

Referring to Fig. 1 the power tool embodying the improved ferrule structure of this invention comprises an elongate casing 10 provided with an electric motor 11 having a shaft 12 which carries a rotatable chuck 13 adapted to hold a bit or tool such as an abrasive wheel 14 and shank 15. The chuck 13 has a manually operable collar 16 threaded on a tubular body part 17 whereby chuck jaws 18 carried in the body may be operated.

The casing 10 of the power tool has a two-part ferrule 20 secured to it, comprising an outer stationary threaded sleeve-like part 21 telescopically receiving an inner sleeve-like part 22, the latter having at its foremost end an integral knurled raised finger grip 23 and being axially movable between retracted and extended positions to lock and unlock the chuck part 17 and to expose the chuck collar 16 for manipulation.

The chuck part 17 includes a clutch or locking ring 24 having external teeth 25 which are engageable and cooperable with internal teeth 26 formed in a tubular member 27 which is rigidly secured to, and forms a section of the inner ferrule part 22. As shown in Figs. 2 and 3 the member 27 is press fitted within the rear portion of the ferrule part 22, and the inner or rearward edge 28 of the latter is crimped over the member 27 to positively retain the same in place. As will be hereinafter more fully brought out, it has been established that solely a press-fit connection between the inner ferrule members is insufficient to adequately hold the same together under certain conditions of use.

The inner ferrule part 22 is held captive in the outer ferrule part 21 by means of lugs 29 which are receivable in L-shaped recesses 30, Fig. 5, part 22 being axially movable from a retracted chuck-exposing position shown in Fig. 3 wherein it locks the one chuck part 17 against turning, to an extended chuck-encircling position shown in Figs. 1 and 2 wherein it permits free turning of the chuck part. The inner ferrule sleeve 22 is spring-urged outwardly to extended position by a helical compression spring 31 engaging at one end the crimped portion 28 of the sleeve, and at the other end the casing 10.

By virtue of the particular shape of the recesses 30 in the outer ferrule part 21, automatic release of the locked chuck part 17 is effected upon energization of the motor 11 of the tool and turning of the shaft 12, since the shaft turns with it to a limited extent the inner ferrule part 22 whereby the latter snaps or pops, to extended chuck-unlocking position when the lugs 29 thereof enter the narrow portions 30a of the recesses 30, all as explained in detail in the application of Joseph Youhouse above referred to. Preferably, as shown, the shoulders 30c of the recesses 30 are sloping but do not incline beyond the angle of repose, thereby to facilitate release-movement of the inner sleeve 22 and of the lugs 29 along the shoulder 30c to the recess portions 30a, as aided by the action of the spring 31.

Heretofore the force of the blow on the lugs 29 when the latter reached the top ends 30b of the recesses 30 ultimately caused a separation of the inner sleeve members 22 and 27 where only a press fit was employed between said members. However, by the organization set forth above wherein the inner edge 28 of the ferrule part 22 is crimped over the locking member 27 there is positively prevented such separation. The said crimping, however, causes the assembly of the ferrule parts 21, 22 and 27 to be extremely difficult and slow to carry out.

Because of the provision of the integral raised knurled hand grip 23 on the inner ferrule part 22, the latter must of necessity be inserted into the ferrule part 21 through the front end thereof. Prior to the present invention it was attempted to assemble the ferrule parts 21, 22 and 27 by inserting the member 27 into the ferrule part 22 while both of these were encircled by the outer ferrule part 22, and then crimping the members 22 and 27 together. This was found to be a difficult and generally unfeasible operation, since the outer part 22 interfered with the crimping tool.

In accordance with the present invention means are provided whereby the ferrule members 22 and 27 may be preassembled to each other prior to their being inserted into the outer part 21. In accomplishing this, referring to Figs. 4, 5 and 6, the outer ferrule part 21 is provided with a plurality of longitudinally extended, internal, lug-clearance grooves 32 which extend from the front end or mouth 33 of the outer ferrule part, rearward past the recesses 30 thereof and connect with said recesses by means of passages 34. By the provision of the grooves 32 the inner ferrule member 27, after being assembled to the ferrule part 22, may be inserted lugs foremost into the outer ferrule part 21 through the front end thereof, the lugs 29 passing through the grooves 22. After such insertion the assemblage of the parts 22 and 27 may be turned either clockwise or counterclockwise and thereafter moved outward a predetermined distance, to shift the lugs 29 first through the passages 34 and then into the recesses 30. Thus the ferrule parts 21 and 22 may be quickly and easily assembled to each other. The ferrule part 21 may be screwed onto the casing 10 after such assembly, or it may be first partially screwed on the casing, the subassembly of the members 22 and 27 inserted in it, and then the screwing completed. When the ferrule parts 21 and 22 are in place on the casing 10, the locking ring 24 of the chuck will be so positioned that, as shown in Fig. 3, if the inner ferrule part 22 is retracted the maximum amount, the engagement between the cooperable teeth of the ring and the locking member 27 will prevent the ferrule part 22 from moving inwardly a sufficient distance to enable the lugs 29 to enter the passages 34. Instead, the walls of the recesses 30 will prevent such movement, and there is thus prevented release of the inner ferrule part from its operative position.

Variations and modifications may be made within the scope of this invention and portions of the improvements may be used without others.

I claim:

1. In a power hand tool having a movable chuck, and having a two-part ferrule comprising a stationary outer sleeve-like part and a movable telescoping inner sleeve-like part, one of said parts being provided with lugs which extend into recesses in the other part whereby said inner part is normally captive in the outer part and axially movable from a retracted position wherein it exposes the chuck to an extended position wherein it encircles the chuck, the improvement which comprises: the other of said ferrule parts having longitudinally-extended lug-clearance grooves which extend from the front end of the part past the recesses of said part and connect with said recesses whereby both ferrule parts may be assembled to each other by first inserting the inner part through the front end of the outer part and then turning the inner part and thereafter moving the same outward a predetermined distance to cause the said recesses to be occupied by said lugs; and stop means associated with said ferrule parts, operable subsequent to said assembly of the parts to limit inward movement of the inner part whereby said lugs are maintained out of the lug-clearance grooves, preventing disassembly of the ferrule.

2. In a power hand tool having a movable chuck, and having a two-part ferrule comprising a stationary outer sleeve and a movable telescoping inner sleeve provided with lugs which are located adjacent its inner end and which extend into internal recesses in the outer sleeve whereby said inner sleeve is normally captive in the outer sleeve and axially movable from a retracted position wherein it exposes the chuck to an extended position wherein it encircles the chuck, the improvement which comprises: the outer sleeve having longitudinally-extended, internal, lug-clearance grooves which extend from the front end of the part past the recesses of the sleeve and connect with said recesses adjacent the rear of the sleeve whereby both sleeves may be assembled by first inserting the inner sleeve through the front end of the outer sleeve and then turning the inner sleeve and thereafter moving the same outward a predetermined distance to bring the lugs thereof into the said recesses; and stop means associated with said sleeves, operable subsequent to said assembly of the sleeve for limiting inward movement of the inner sleeve to prevent return of said lugs to the grooves and disassembly of the sleeves.

3. In a power hand tool having a multi-part, rotatable chuck, and having a two-part ferrule comprising a stationary outer sleeve and a movable telescoping inner sleeve provided with lugs which are located adjacent its inner end and which extend into internal recesses in the outer sleeve whereby said inner sleeve is normally captive in the outer sleeve and axially movable from a retracted chuck-exposing position wherein it locks one chuck part against turning to an extended chuck-encircling position wherein it permits free turning of the chuck, the improvement which comprises: the outer sleeve having longitudinally-extended, internal, lug-clearance groves which extend from the front end of the part past the recesses of the sleeve and connect with said recesses adjacent the rear of the sleeve whereby both sleeves may be assembled by first inserting the inner sleeve through the front end of the outer sleeve and then turning the inner sleeve and thereafter moving the same outward a predetermined distance to bring the lugs thereof into the said recesses; and stop means including the said one chuck part, adapted for engagement with the inner sleeve for limiting inward movement of the latter to prevent return of said lugs to the grooves and disassembly of the sleeves.

4. In a power hand tool having a multi-part, rotatable chuck, and having a casing carrying a two-part ferrule comprising a stationary outer sleeve and a movable telescoping inner sleeve provided with lugs which are located adjacent its inner end and which extend into internal recesses in the outer sleeve whereby said inner sleeve is normally captive in the outer sleeve and axially movable from a retracted chuck-exposing position wherein it locks one chuck part against turning to an extended chuck-encircling position wherein it permits free turning of the chuck, said inner sleeve and one chuck part having cooperable clutch teeth, the improvement which comprises: the outer sleeve having longitudinally-extended, internal, lug-clearance grooves which extend from the front end of the part past the recesses of the sleeve and connect with said recesses adjacent the rear of the sleeve whereby both sleeves may be assembled by first inserting the inner sleeve through the front end of the outer sleeve and then turning the inner sleeve and thereafter moving the same outward a predetermined distance to bring the lugs thereof into the said recesses; and stop means for limiting inward movement of the inner sleeve to prevent return of said lugs to the grooves and disasembly of the sleeves, said stop means being operative when the outer sleeve is mounted in normal position on the casing and comprising the cooperable toothed portions of the inner sleeve and one chuck part.

5. In a power hand tool having a multi-part, rotatable chuck, and having a casing carrying a two-part ferrule comprising a stationary outer sleeve threaded on the casing and a movable telescoping inner sleeve provided with lugs which are located adjacent its inner end and which extend into internal recesses in the outer sleeve whereby said inner sleeve is normally captive in the outer sleeve and axially movable from a retracted chuck-exposing position wherein its locks one chuck part against turning to an extended chuck-encircling position wherein it permits free turning of the chuck, said inner sleeve and one chuck part having cooperable clutch teeth, the improvement which comprises: the outer sleeve having longitudinally-extended, internal, lug-clearance grooves which extend from the front end of the part past the recesses of the sleeve and connect with said recesses adjacent the rear of the sleeve whereby both sleeves may be assembled by first inserting the inner sleeve through the front end of the outer sleeve and then turning the inner sleeve and thereafter moving the same outward a predetermined distance to bring the lugs thereof into the said recesses; and stop means for limiting inward movement of the inner sleeve to prevent return of said lugs to the grooves and disassembly of the sleeves, said stop means being operative when the outer sleeve is fully threaded on the casing and comprising the cooperable toothed portions of the inner sleeve and one chuck part.

6. In a power hand tool having a multi-part, rotatable chuck, and having a casing carrying a two-part ferrule comprising a stationary outer sleeve-like part threaded on the casing and a movable telescoping inner sleeve-like part, one of said parts being provided with lugs which extend into recesses in the other part whereby said inner part is normally captive in the outer part and axially movable from a retracted chuck-exposing position wherein it locks one chuck part against turning to an extended chuck-encircling position wherein it permits free turning of the chuck, said inner ferrule part and one chuck part having cooperable clutch teeth, the improvement which comprises: the other of said ferrule parts having longitudinally-extended lug-clearance grooves which extend from the front end of the part past the recesses of said part and connect with said recesses whereby both ferrule parts may be assembled to each other by first inserting the inner part through the front end of the outer part and then turning the inner part and thereafter moving the same outward a predetermined distance to cause the said recesses to be occupied by said lugs; and stop means for limiting inward movement of the inner ferrule part to prevent return of said lugs to the grooves and disassembly of the ferrule, said stop means being operative when the outer ferrule part is fully threaded on the casing, and comprising the cooperable toothed portions of the inner ferrule part and one chuck part.

JOSEPH BERTA.

REFERENCES CITED

The following references are of record in the file of this patent:

UNITED STATES PATENTS

| Number | Name | Date |
| --- | --- | --- |
| 1,788,565 | Davis | Jan. 13, 1931 |
| 1,970,184 | Pendelton | Aug. 14, 1934 |
| 2,341,529 | Cohen | Feb. 15, 1944 |

FOREIGN PATENTS

| Number | Country | Date |
| --- | --- | --- |
| 72,085 | Switzerland | 1916 |